United States Patent
Stahl, Sr. et al.

(10) Patent No.: US 7,797,893 B2
(45) Date of Patent: *Sep. 21, 2010

(54) APPARATUS FOR REINFORCING AND FIRESTOPPING AROUND A DUCT EXTENDING THROUGH A STRUCTURAL PANEL

(75) Inventors: James P. Stahl, Sr., Stockton, NJ (US); James P. Stahl, Jr., Princeton Junction, NJ (US)

(73) Assignee: Specified Technologies Inc., Somerville, NJ (US)

( * ) Notice: Subject to any disclaimer, the term of this patent is extended or adjusted under 35 U.S.C. 154(b) by 610 days.

This patent is subject to a terminal disclaimer.

(21) Appl. No.: 11/432,092

(22) Filed: May 11, 2006

(65) Prior Publication Data

US 2007/0261339 A1    Nov. 15, 2007

(51) Int. Cl.
E04C 2/08 (2006.01)
E04G 15/06 (2006.01)

(52) U.S. Cl. .................... 52/220.8; 52/232; 52/219; 52/656.3; 52/656.2

(58) Field of Classification Search ............ 52/232, 52/220.8, 198, 199, 200, 58, 219, 656.3, 52/396.01, 656.2
See application file for complete search history.

(56) References Cited

U.S. PATENT DOCUMENTS

| | | | |
|---|---|---|---|
| 928,153 A * | 7/1909 | Potthoff ..................... 52/232 |
| 1,798,152 A * | 3/1931 | Farley ..................... 52/220.8 |
| 4,109,423 A * | 8/1978 | Perrain ..................... 52/1 |
| 4,183,379 A | 1/1980 | Marquette et al. |
| 4,464,821 A | 8/1984 | Haytayan |
| 4,469,018 A | 9/1984 | Taulman |
| 4,616,459 A | 10/1986 | Shubow |
| 4,758,003 A * | 7/1988 | Goldstein et al. ........... 277/314 |
| 4,885,890 A | 12/1989 | Deren |
| 4,941,630 A | 7/1990 | Albano |
| 5,103,609 A * | 4/1992 | Thoreson et al. ............. 52/232 |
| 5,105,592 A * | 4/1992 | MacMillan et al. ........... 52/232 |
| 5,287,665 A * | 2/1994 | Rath, Jr. .................... 52/220.8 |
| 5,303,529 A | 4/1994 | Guardia |
| 5,568,947 A * | 10/1996 | Paquette .................... 285/46 |
| 5,725,331 A * | 3/1998 | Martinez .................... 405/303 |
| 5,741,390 A | 4/1998 | Schmuck et al. |
| 5,744,076 A | 4/1998 | Baxter |
| 5,765,332 A | 6/1998 | Landin et al. |
| 5,848,509 A | 12/1998 | Knapp et al. |
| 5,974,750 A | 11/1999 | Landin et al. |
| 6,141,929 A | 11/2000 | Kistner et al. |
| 6,257,282 B1 | 7/2001 | Emmer et al. |
| 6,358,591 B1 | 3/2002 | Smith |

(Continued)

*Primary Examiner*—Brian E Glessner
*Assistant Examiner*—Jason Holloway
(74) *Attorney, Agent, or Firm*—Sperry, Zoda & Kane

(57) ABSTRACT

An angular flange for reinforcing and firestopping in the annulus between a structural panel such as a wall, ceiling or floor and a duct extending therethrough. The prefabricated angular flange includes a first flange leg to be secured to the duct and a second flange leg with a sealing member preferably of flexibly resilient foam which could be intumescent attached to a surface of the second leg such that when the first flange leg is secured to the duct the second flange leg can be urged against the structural panel extending therearound with the sealing member positioned between the structural panel and the second flange leg and sealing the annulus.

19 Claims, 2 Drawing Sheets

U.S. PATENT DOCUMENTS

| | | | |
|---|---|---|---|
| 6,495,753 B1 * | 12/2002 | Goodsell et al. | 174/483 |
| 6,806,212 B2 | 10/2004 | Fyfe | |
| 6,820,382 B1 | 11/2004 | Chambers et al. | |
| 6,935,379 B1 | 8/2005 | Buchanan, Sr. | |
| 7,373,761 B2 * | 5/2008 | Stahl, Sr. | 52/232 |
| 7,596,914 B2 * | 10/2009 | Stahl et al. | 52/220.8 |
| 2002/0056242 A1 * | 5/2002 | Andresen | 52/220.8 |
| 2004/0168398 A1 * | 9/2004 | Sakno et al. | 52/741.4 |

* cited by examiner

APPARATUS FOR REINFORCING AND FIRESTOPPING AROUND A DUCT EXTENDING THROUGH A STRUCTURAL PANEL

BACKGROUND OF THE INVENTION

1. Field Of The Invention

Air ducting for venting, heating and/or air conditioning as well as other applications and purposes can provide some difficulty when providing firestopping therearound as they extend or penetrate through structural panels such as walls, floors and ceilings. Whenever the barriers are fire-rated it is necessary that firestopping be provided around such ducts. Some times fire dampers can be installed in line with the air duct at the locations where the ducts penetrate smoke or fire barriers. Often the ducts will pass through the barriers without requiring the placement of fire dampers.

Typically firestopping is provided around such ducts by installing packing material such as mineral wool within the annulus between the duct and the inside of the opening in the structural panel. Some type of a mechanical means such as a bracket or the like is often utilized for maintaining the spacing between the duct and the structural panel in order to maintain the structural integrity of the wall when exposed to fire conditions such as heat or smoke as well as to allow the fireproofing materials to operate properly and effectively seal the annulus when exposed to such fire conditions.

After a duct has been placed extending through a structural wall, ceiling or floor initially fireproofing is applied into the annulus. This fireproofing needs to be inspected by an appropriate government inspector to be sure that it meets local code requirements. Thereafter the mechanical contractor will be required to visit the site to place the flange extending between the duct and the structural panel. Inspection of the fireproofing is not possible after the panel is placed since the annulus is often hidden by the mechanical bracket extending between the duct and the panel. The present invention provides a prefabricated unit which provides a structural bracket for extending between the duct and the structural panel for maintaining spacing therebetween and includes a pre-installed fireproofing seal applied to the surface of the bracket which will be placed adjacent to the annulus for effecting sealing and mechanical connecting between the duct and the surrounding panel simultaneously. As such, this modular concept wherein the fireproofing is already pre-installed onto the mechanical bracket eliminates the necessity of having one skilled technical, namely, fireproofing personnel, apply the fireproofing into the annulus followed by inspection and thereafter having a mechanical contractor place the bracket in place. The placement of this modular bracket which includes fireproofing can be placed by the mechanical contractor thereby eliminating the unnecessary placement or insertion step by fireproofing personnel.

2. Description Of The Prior Art

Other devices have been utilized for reinforcing and/or firestopping of duct flange such as shown in U.S. Pat. No. 4,183,379 patented Jan. 15, 1980 to R. L. Marquette et al and assigned to Mutz Corp. on a "Duct Board Assembly"; and U.S. Pat. No. 4,464,821 patented Aug. 14, 1984 to H. M. Haytayan and assigned to Pneutek, Inc. on a "Method Of Attaching Insulation To A Mold"; and U.S. Pat. No. 4,469,018 patented Sep. 4, 1984 to N. W. Taulman on an "Energy-Saving Closure For Foundation Vents"; and U.S. Pat. No. 4,616,459 patented Oct. 14, 1986 to C. Shubow on a "Building Construction Using Hollow Core Wall"; and U.S. Pat. No. 4,885,890 patented Dec. 12, 1989 to G. W. Deren and assigned to STEMCOR Corporation on a "Modular Furnace Lining And Hardware System Therefor"; and U.S. Pat. No. 4,941,630 patented Jul. 17, 1990 to J. A. Albano on an "Isolating Pipe Strap For Plumbing Pipes"; and U.S. Pat. No. 5,303,529 patented Apr. 19, 1994 to R. Guardia and assigned to Sap Baustoffe and Bauchemie AG on an "Attachment Of Objects On An Insulation Layer Of Low Mechanical Strength"; and U.S. Pat. No. 5,741,390 patented Apr. 21, 1998 to J. C. Schmuck et al and assigned to Rieter Automotive (International) AG on a "Sound-Insulating Vehicle Body Part"; and U.S. Pat. No. 5,744,076 patented Apr. 28, 1998 to K. I. Baxter on a "Method For Making Insulated Concrete Wall Tie System"; and U.S. Pat. No. 5,765,332 patented Jun. 16, 1998 to H. V. Landin et al and assigned to Minnesota Mining And Manufacturing Company on a "Fire Barrier Protected Dynamic Joint"; and U.S. Pat. No. 5,848,509 patented Dec. 15, 1998 to K. D. Knapp et al and assigned to Certain-Teed Corporation on an "Encapsulated Insulation Assembly"; and U.S. Pat. No. 5,974,750 patented Nov. 2, 1999 to H. V. Landin et al and assigned to 3M Innovative Properties Company on a "Fire Barrier Protected Dynamic Joint"; and U.S. Pat. No. 6,141,929 patented Nov. 7, 2000 to M. J. Kistner et al and assigned to Kistner Concrete Products, Inc. on an "Insulated Pre-Formed Wall Panels"; and U.S. Pat. No. 6,257,282 patented Jul. 10, 2001 to C. D. Emmer et al and assigned to MVE, Inc. on a "Vacuum Insulated Pipe"; and U.S. Pat. No. 6,358,591 patented Mar. 19, 2002 to S. S. Smith and assigned to Orcon Corporation on a "Fire-Blocking Insulation Blanket"; and U.S. Pat. No. 6,806,212 patented Oct. 19, 2004 to E. R. Fyfe and assigned to Fyfe Co., LLC on a "Coating And Method For Strengthening A Structure"; and U.S. Pat. No. 6,820,382 patented Nov. 23, 2004 to D. C. Chambers et al and assigned to 3M Innovative Properties Company on a "Fire Stop And Its Use"; and U.S. Pat. No. 6,935,379 patented Aug. 30, 2005 to M. C Buchanan, Sr. on a "Prefabricated Insulation For HVAC Ductwork And Other Fluid Conduits".

SUMMARY OF THE INVENTION

The present invention provides a unique construction which eliminates the necessity for staged inspections by local building code authorities due to the modular construction wherein the firestop seal is attached directly to a mechanical bracket which extends between the duct and a structural panel extending therearound for sealing the annulus therebetween with fireproofing material while at the same time providing mechanical connections therebetween which maintains the structural spacing and integrity of the pass through apparatus.

In the preferred configuration for the apparatus of the present invention an angular flange is attachable with respect to a structural panel and to a duct extending therethrough for the purpose of facilitating firestop sealing therearound. This angular flange preferably has a cross-section similar to commonly available angular steel. The angular flange preferably includes a first flange leg positioned extending along the duct at a position adjacent to the structural wall member which extends therearound. The first flange leg will define an inner first leg surface attachable with respect to the duct at a position adjacent to the structural panel positioned therearound. This first flange leg will define a securement aperture such as a securement slot extending therethrough to facilitate adjustability of the securement of the inner first leg surface of the first flange leg to the duct. The first flange leg can also include a reinforcing means extending therealong to enhance the overall structural strength thereof.

A second flange leg can be included which preferably is integrally formed with respect to the first flange leg and extends longitudinally therealong to define an angular flange shape therewith. This second flange leg will preferably define an inner second leg surface facing the structural panel which extends therearound to facilitate firestop sealing between the structural panel and a duct extending therethrough. The inner second leg surface of the second flange leg will preferably be oriented extending approximately perpendicularly outwardly with respect to the inner first leg surface of the first flange leg to facilitate attachment of the angular flange with respect to the structural panel and to the duct extending therethrough as well as for firestop sealing therebetween. The inner first leg surface of the first flange leg and the inner second leg surface of the second flange leg will preferably be oriented perpendicularly with respect to one another.

A sealing member is also included of flexibly resilient material, preferably foam material, which could be intumescent but need not necessarily be. This sealing member is attached to the inner second leg surface of the second flange leg and is positionable between the structural panel and the inner second leg surface. The sealing member includes an extended sealing section extending outwardly from the inner second leg surface beyond the plane of the inner first leg surface to facilitate compression thereof against the duct responsive to securement of the inner first leg surface of the first flange leg with respect to the duct for the purpose of enhancing firestop sealing between the structural panel the penetrating duct.

A sealing securement means may be included such as an adhesive means or glue means or other attachment mechanism for the purpose of securing the sealing member with respect to the inner second leg surface of the second flange leg to form a pre-fabricated bracket and firestop sealing construction. A first leg securement mechanism can also be included for mechanical securement of the inner first leg surface of the first flange leg to the duct. The first leg is preferably positionable extending through the securement slot.

It should be appreciated that a reinforcement means such as a reinforcing rib or arcuate section can be included in the first flange leg or the second flange leg at any location therealong where such longitudinally extending structural strength would be found to be useful.

It is also noted that a securement means can be provided for securing of the first flange leg with respect to the duct as well as the possible inclusion of a securement means for securing the second flange leg with respect to the surrounding structural panel. With either of these constructions mechanical fasteners such as screws or rivets can be utilized. It should be noted that the inclusion of a separate securement means extending through the second flange leg is not a requirement of the present invention but only an optional requirement. It has been found that the use of the first securement means extending through the first flange leg for securement thereof with respect to the duct will provide a fully efficient means of securement which can also extend to attaching of the second flange leg to the structural panel. This is made possible because when the first securement means is attached normally some compression of the sealing member positioned between the second flange leg and the structural panel will be achieved. This compression will provide a means of securement between the structural panel and the inner second leg surface of the second flange leg for achieving securement therebetween. It is also under the contemplation of the present invention that a separate securement means can be included extending through the second flange leg for direct positive mechanical attachment thereof with respect to the surrounding structural panel.

One of the important characteristics of the present invention is the inclusion of an extended sealing section on the sealing member. This extended sealing section preferably will extend outwardly from the inner second leg surface beyond the plane of the inner first leg surface which facilitates compression thereof against the duct responsive to securement of the inner first leg surface of the first flange leg with respect to the duct which significantly enhances firestopping in the annular region between the structural panel and the duct penetrating therethrough. As such, this extended section itself will be brought into abutment with the duct and will compress thereagainst thereby providing a continuous seal extending from the duct to the structural panel which extends completely over the annular space therebetween. It should also be appreciated that the present invention can be constructed utilizing an additional or supplemental seal positioned between the inner first leg surface of the first flange leg and the duct to further enhance sealing achieved by the apparatus of the present invention extending fully from the duct to the structural panel extending therearound.

It is an object of the present invention to provide an apparatus for reinforcing and firestopping around a duct extending through a structural panel wherein staging of the steps of firestopping placement and mechanical bracket attachment is eliminated.

It is an object of the present invention to provide an apparatus for reinforcing and firestopping around a duct extending through a structural panel wherein a modular apparatus can be provided for simultaneously attaching a mechanical bracket between the duct and the structural panel therearound and firestop sealing of the space or annulus located therebetween.

It is an object of the present invention to provide an apparatus for reinforcing and firestopping around a duct extending through a structural panel which is easily maintained.

It is an object of the present invention to provide an apparatus for reinforcing and firestopping around a duct extending through a structural panel which can be easily replaced in a modular manner when needed.

It is an object of the present invention to provide an apparatus for reinforcing and firestopping around a duct extending through a structural panel which allows firestopping to be placed in an annulus between a duct and a surrounding wall panel by a mechanical contractor simultaneously with placing of a structural mechanical bracket extending therebetween.

It is an object of the present invention to provide an apparatus for reinforcing and firestopping around a duct extending through a structural panel which can eliminate staged inspections by local building code authorities.

It is an object of the present invention to provide an apparatus for reinforcing and firestopping around a duct extending through a structural panel which is much easier and convenient to place than the use of caulking and/or mineral wool in the space between a duct and a surrounding structural panel.

It is an object of the present invention to provide an apparatus for reinforcing and firestopping around a duct extending through a structural panel which is adjustable in positioning to vary the spacing between the second flange leg of the annular flange and the structural panel.

It is an object of the present invention to provide an apparatus for reinforcing and firestopping around a duct extending through a structural panel which can be provided with a flexibly resilient foam firestopping material which is fireproof and, as such, resistant to the flow of smoke and heat thereby.

It is an object of the present invention to provide an apparatus for reinforcing and firestopping around a duct extending through a structural pane which can optionally be constructed with intumescent firestopping material.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
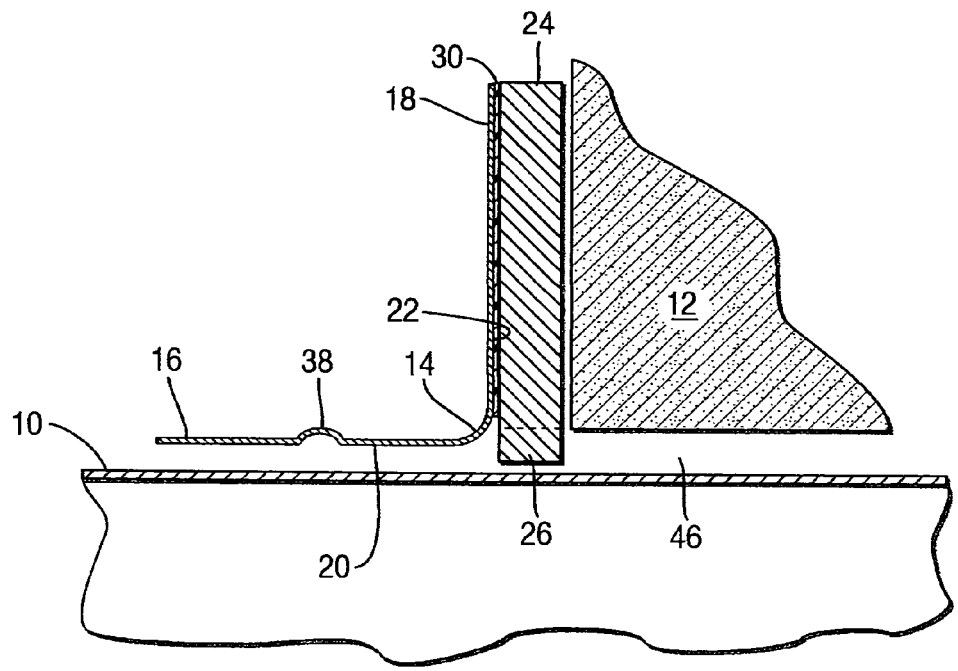
FIG. 1 is a cross-sectional view of an embodiment of the apparatus for reinforcing and firestopping around a duct extending through a structural panel.

The present invention provides an apparatus which reinforces and firestops between a duct 10 and a structural panel 12 through which duct 10 extends. Such ducts are commonly required for heating, ventilating and air conditioning as well as other purposes and will be positioned extending through various structural panels 12 such as walls, floors and/or ceilings in residential as well as commercial buildings. When these structural panels 12 are fire rated it is necessary that firestopping be provided in the space or annulus 46 immediately surrounding such ducts 10 between the exterior surface of the duct and the interior edge of the structural barrier panel 12.

Whenever such a structural barrier or panel 12 is fire rated it is necessary that some type of firestopping seal be placed in this space or annulus 46. This normally requires a two-step operation wherein initially firestopping material is placed into the annulus 46. Such firestopping material can be various combinations of caulking and/or mineral wool or other firestopping materials. Thereafter a structural bracket can be positioned extending between the duct 10 and the structural panel 12 for maintaining the integrity of the structural strength therebetween and for maintaining the spacing and other dimensions especially when subjected to fire conditions such as heat and smoke. The present invention provides a unique modular pre-fabricated apparatus which simultaneously places this structural bracket while at the same time achieves the firestopping needed in this space 46. Both purposes are accomplished by the placement of the apparatus of the present invention.

The apparatus of the present invention particularly includes an angular flange 14 which is normally made of metal and is in the shape of a commonly available angular iron material. Such angular flange 14 includes a first flange leg 16 adapted to be positioned extending along the duct 10 at a position adjacent to the structural wall member or panel 16 extending therearound. This first flange leg 16 will preferably define an inner first leg surface 20 adapted to be attached with respect to the duct 10 by a first leg securement means 32. First leg securement means 32 can be any securement unit means but preferably is some type of a mechanical fastener 34 such as a screw or rivet or similar device.

As shown in this embodiment a second flange leg 18 is secured with respect to the first flange leg and extends horizontally therealong. Preferably the second flange leg 18 is integrally formed with a singular angular flange construction with respect to the first flange leg. The second flange leg defines an inner second leg surface 22 facing the structural panel 12 and extending therearound to facilitate firestop sealing between panel 12 and duct 10 extending therethrough. In the preferred configuration the inner second leg surface 22 of the second flange leg 18 is oriented extending approximately perpendicularly outwardly with respect to the inner first leg surface 20 of the first flange leg 16 to facilitate attachment of the angular flange 14 to the structural panel 12 and to the duct 10 extending therethrough and for firestop sealing of the space 46 defined therebetween.

Figure 2:
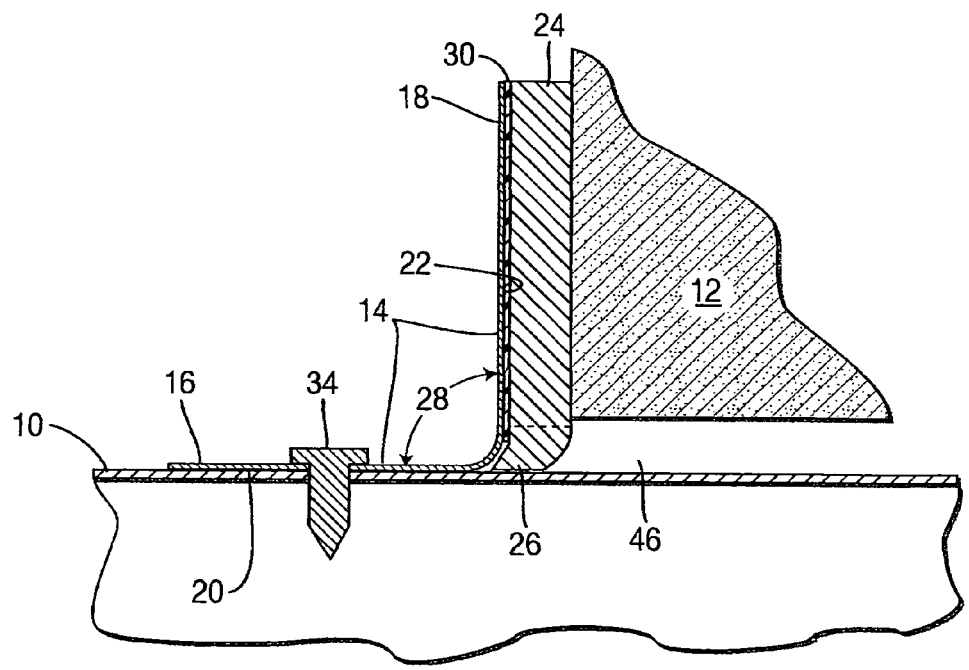
FIG. 2 is an alternate construction somewhat similar to FIG. 1 with the inclusion of a first leg mechanical fastener securement device extending through the first leg and secured to the duct therebeneath.

A sealing member 24 is also included which is made of a fireproof material such as a firestopping foam material for sealing against fire conditions such as smoke and heat. The sealing member 24 can be formed of intumescent material but it could be fully operative even if it was formed of only fireproofing material. This sealing member 24 is attached to the inner second leg surface 22 of the second flange leg 18 such as to be positionable between the structural panel 12 and the inner second leg surface 22. In this manner the sealing member will facilitate sealing between the angular flange 14 and the structural panel 12 with which it is positioned in abutment. The sealing member 24 will preferably include an extended sealing section 26 extending downwardly therefrom as shown best in FIG. 1 and FIG. 2 which is adapted to abut the duct 10 and in this manner seal the annular space 46 between duct 10 and structural panel 12. In the preferred configurations as shown in FIGS. 1 and 2 securement of the first leg mechanical securement fastener 32 or 34 with respect to the first flange leg 16 and the duct 10 will also urge the inner second leg surface 22 of the second flange leg 18 into abutment with respect to the structural panel 12 positioned thereadjacent. As such, it can be seen that securement of the first leg securement means 32 will in this manner secure the first flange leg 16 to the duct 10 and also provide an element of securement of the second flange leg 18 with respect to the structural panel 12. Thus this singular modular unit merely by the attachment of the first leg securement means 32 will simultaneously place a mechanical bracket extending between duct 10 and structural panel 12 while simultaneously firestop sealing of the annular space 46 defined therebetween. The capability of performing both of these desired steps simultaneously with a single apparatus is an important enhancement made possible by the construction of the present invention. The first leg securement means 32 is preferably positioned such as to provide a screw or rivet or other mechanical fastener 34 which can extend through the securement aperture means 36 defined in the first flange leg 16 and into engagement with the duct 10 therebelow as shown in FIGS. 1 and 2.

A first flange reinforcing means 38 can be provided by a mechanical ridge or rim extending longitudinally along the first flange leg 16 for the purpose of structurally strengthening thereof. In a similar manner a second flange leg reinforcing means 40 can be provided extending longitudinally along the second flange leg 18 for providing structural strength longitudinally therealong.

Figure 3:
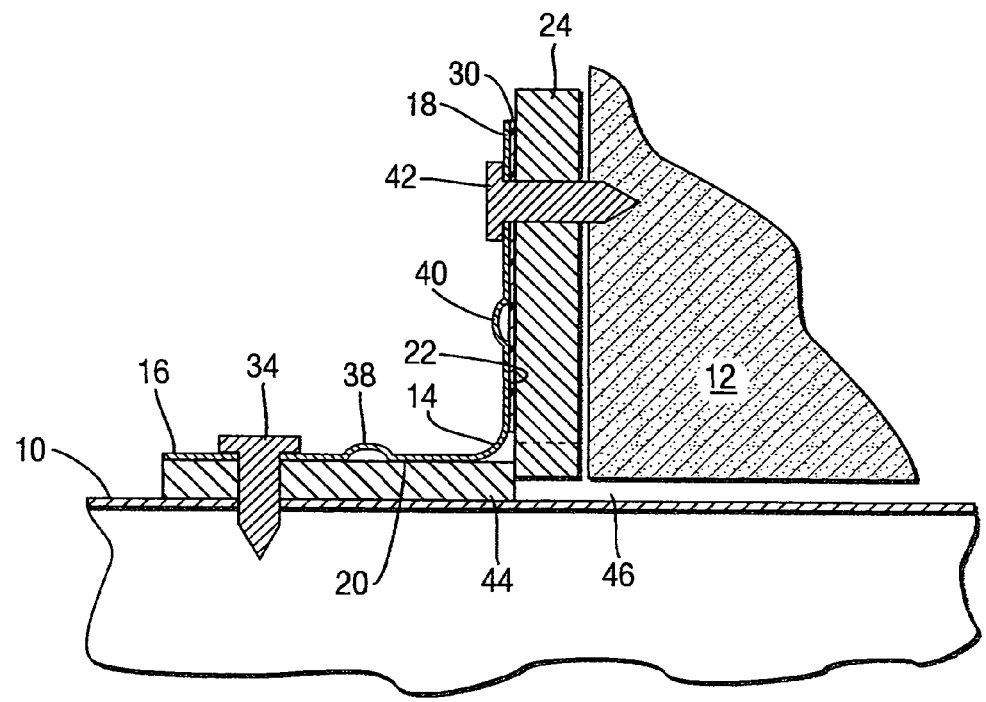
FIG. 3 is a cross-sectional view of an alternative embodiment similar to the embodiment shown in FIG. 1 which further includes a second flange leg reinforcing means and a second leg securement means as well as a supplemental seal positioned between the first flange leg and the duct.

In some circumstances it may be necessary to provide a direct means of attachment of the second flange leg 18 with respect to the structural wall 12. This can be provided by the inclusion of a second leg securement means 42 as shown best in FIG. 3.

In the preferred configuration of the present invention the inner first leg surface 20 of the first flange leg 16 and the inner second leg surface 22 of the second flange leg 18 are oriented approximately perpendicularly with respect to one another. This orientation is necessary because during most applications the surface of the duct 10 is perpendicular with respect to the surface of the structural panel 14. This perpendicular angle 28 is shown in FIG. 2.

To provide a modular apparatus of the present invention it is important that the sealing member 24 be secured in some manner with respect to the inner second leg surface 22 of the second flange leg 18. This can be achieved by the inclusion of a sealing securement means 30 for providing this adherence. Sealing securement means 30 can be provided by any type of an adhesive or glue means or any other attachment means which will firmly mount the sealing member 24 to the inner second leg surface 22 of the second flange leg 18.

In some constructions an additional supplemental seal 44 will be provided which is secured to the inner first leg surface 20 of the first flange leg 16 for positioning between duct 10 and the first flange leg 16 for further enhancing sealing engagement therebetween.

One of the important structural constructions of the present invention is in the inclusion of the extended sealing section 26. As shown best in FIG. 1 the extended sealing section 26 extends outwardly from the inner second leg surface 22 beyond the plane of the inner first leg surface 20 which is shown in the downward direction in FIG. 1. This extended section 26 is designed to abut and compress against the duct 10 responsive to downward movement of the first flange leg 16 which will normally occur during securing of the first leg securement means 32. As this securement means is tightened the first flange leg 16 will move downwardly which will compress the extended sealing section 26 against the duct 10 while simultaneously compressing the inner surface thereof against the structural panel 12 and thereby achieve complete and full sealing against both duct 10 and panel 12. Sealing against the duct 10 also could be further enhanced by the inclusion of the supplemental seal 44 shown in FIG. 3.

Figure 4:
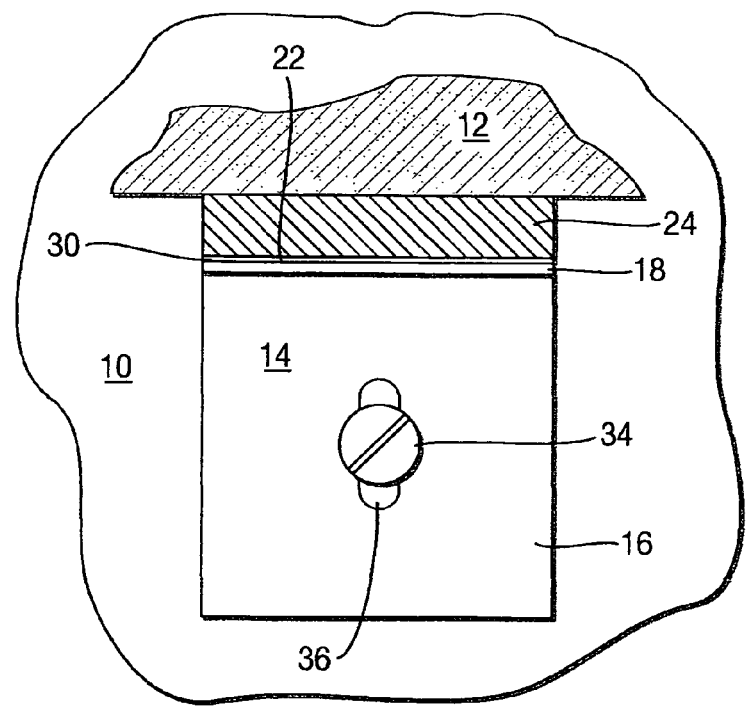
FIG. 4 is a top plan view of the embodiment shown in FIG. 2.

In the configuration of FIG. 1 and FIG. 2 it is preferable that the sealing securement screw 34 be mounted extending through a securement aperture 36 defined in the first flange leg 16. Preferably this securement aperture 36 is a longitudinally extending slot as shown best in FIG. 4. As such, when the mechanical fastener 34 is tightened by the installation personnel, the angular flange 14 can be physically moved toward the structural panel 12. As such, the amount of compression exerted on the sealing member 24 can be controlled and in this manner the compression thereof against the structural panel 12 can be adjusted as desired. As this movement occurs, as shown in FIG. 2, the bottommost edge of the extended sealing section 26 will "wipe" against the duct and assume the general configuration shown in FIG. 2 wherein it is slightly angled toward the left at the lowermost edges thereof. This will further enhance sealing engagement between the sealing member 24 and the duct 10 therebelow as well as the structural panel 12 to the right thereof as shown best in FIG. 2. As such, the tightening of a single securement means can achieve mechanical connection between the duct 10 and the structural panel 12 while simultaneously sealing against both said parts as well as the space or opening 46 defined therebetween.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. An apparatus for reinforcing and firestopping around a duct extending through a structural panel comprising:
   A. an angular flange positioned between a structural panel and a duct extending therethrough for facilitating firestop sealing therearound, said angular flange including:
      (1) a first flange leg being generally planar in configuration and positioned extending along the duct at a position adjacent to the structural panel positioned therearound, said first flange leg defining an inner first leg surface attachable with respect to the duct at a position adjacent to the structural panel positioned therearound;
      (2) a second flange leg being generally planar in configuration and securely positioned with respect to said first flange leg and extending longitudinally thereal-ong, said second flange leg defining an inner second leg surface facing the structural panel extending therearound to facilitate firestop sealing between the structural panel and a duct extending therethrough, said inner second leg surface of said second flange leg being oriented extending approximately perpendicularly outwardly with respect to said inner first leg surface of said first flange leg to facilitate attachment of the angular flange adjacent to the structural panel and to the duct extending therethrough for firestop sealing therebetween; and
   B. a sealing member of flexibly resilient material attached to said inner second leg surface of said second flange leg and positionable at least partially between the structural panel and said inner second leg surface, said sealing member including an extended sealing section extending outwardly from said inner second leg surface in an approximately parallel direction with respect to said inner second leg surface of said second flange leg and toward the duct, said extended sealing section being oriented approximately perpendicularly with respect to said inner first leg surface of said first flange leg and extending therepast toward the duct to a position extending beyond the plane of the generally planar configuration of said inner first leg surface of said first flange leg and beyond any portion of said angular flange to allow deformation thereof by compression of said extended sealing section of said sealing member against the duct due to the flexible resilience thereof responsive to being urged into direct abutment and compression against the duct responsive to securement of said inner first leg surface of said first flange leg directly into abutting engagement with respect to the duct for enhancing firestop sealing between the structural panel and the penetrating duct without requiring attachment of said second flange leg directly with respect to the structural panel thereadjacent.

2. An apparatus for reinforcing and firestopping around a duct extending through a panel as defined in claim 1 wherein said first flange leg and said second flange leg are integrally formed as a single integral part.

3. An apparatus for reinforcing and firestopping around a duct extending through a panel as defined in claim 1 further including a sealing securement means for securing said sealing member with respect to said inner second leg surface of said second flange leg.

4. An apparatus for reinforcing and firestopping around a duct extending through a panel as defined in claim 3 wherein said sealing securement means comprises an adhesive means.

5. An apparatus for reinforcing and firestopping around a duct extending through a panel as defined in claim 1 further comprising a first leg securement means for securement of said inner first leg surface of said first flange leg to the duct.

6. An apparatus for reinforcing and firestopping around a duct extending through a panel as defined in claim 5 wherein said first leg securement means comprises a mechanical fastener means adapted to extend through said first flange leg and into engagement with the duct thereadjacent.

7. An apparatus for reinforcing and firestopping around a duct extending through a panel as defined in claim 6 wherein said mechanical fastener means comprises a screw or rivet.

8. An apparatus for reinforcing and firestopping around a duct extending through a panel as defined in claim 5 wherein said first flange leg defines a securement aperture means extending therethrough to facilitate securement of said inner first leg surface of said first flange leg to the duct by said first leg securement means.

9. An apparatus for reinforcing and firestopping around a duct extending through a panel as defined in claim 8 wherein said securement aperture means is defined extending longitudinally along said first flange leg to facilitate adjustable positioning thereof relative to the structural panel.

10. An apparatus for reinforcing and firestopping around a duct extending through a panel as defined in claim 9 wherein said sealing securement means facilitates adjustable positioning of the angular flange relative to the structural panel and the duct by allowing for varying degrees of compression of the sealing member between the inner second leg surface and the surrounding structural panel.

11. An apparatus for reinforcing and firestopping around a duct extending through a panel as defined in claim 1 further comprising a first flange leg reinforcing means extending therealong for enhancement of the structural strength thereof.

12. An apparatus for reinforcing and firestopping around a duct extending through a panel as defined in claim 1 further comprising a second flange leg reinforcing means extending therealong for enhancement of the structural strength thereof.

13. An apparatus for reinforcing and firestopping around a duct extending through a panel as defined in claim 1 wherein said sealing member is fire-resistant such that it is capable of sealing against fire or smoke passing therethrough.

14. An apparatus for reinforcing and firestopping around a duct extending through a panel as defined in claim 1 wherein said sealing member is intumescent.

15. An apparatus for reinforcing and firestopping around a duct extending through a panel as defined in claim 1 further comprising a supplemental seal attached to the said inner first leg surface of said first flange leg for positioning between the duct and the inner first leg surface for further enhancing sealing between the structural panel and the duct extending therethrough.

16. An apparatus for reinforcing and firestopping around a duct extending through a structural panel comprising:
A. an angular flange attachable positioned between a structural panel and a duct extending therethrough for facilitating firestop sealing therearound, said angular flange including:
 (1) a first flange positioned between a structural panel and a duct extending along the duct at a position adjacent to the structural panel positioned therearound, said first flange leg defining an inner first leg surface attachable with respect to the duct at a position adjacent to the structural panel positioned therearound;
 (2) a second flange leg being generally planar in configuration and securely positioned with respect to said first flange leg and extending longitudinally outwardly therefrom, said second flange leg defining an inner second leg surface facing the structural panel extending therearound to facilitate firestop sealing between the structural panel and a duct extending therethrough, said inner second leg surface of said second flange leg being oriented extending approximately perpendicularly outwardly with respect to said inner first leg surface of said first flange leg to facilitate attachment of the angular flange adjacent to the structural panel and to the duct extending therethrough for firestop sealing therebetween;
B. a supplemental seal being generally planar in configuration and being attached with respect to said inner first leg surface at a position extending over said first flange leg for facilitating positioning thereof between the duct and said inner first leg surface thereadjacent, said supplemental seal being positioned in direct non-compressing abutment with respect to said inner first leg surface and in direct non-compressing abutment with respect to the duct responsive to attaching of said inner first leg surface with respect to the duct with said supplemental seal positioned therebetween for sealing between the structural panel and the duct extending therethrough; and
C. a sealing member of flexibly resilient material attached to said inner second leg surface of said second flange leg and positionable at least partially between the structural panel and said inner second leg surface, said sealing member including an extended sealing section extending outwardly from said inner second leg surface in a direction extending approximately parallel with respect to said inner second leg surface of said second flange leg and toward the duct, said extended sealing section being oriented approximately perpendicularly with respect to said supplemental seal and with respect to said inner first leg surface of said first flange leg and extending past said supplemental seal toward the duct to a position extending beyond the generally planar configuration of said inner first leg surface of said first flange leg and beyond the generally planar configuration of said supplemental seal and beyond any portion of said angular flange to allow deformation of said extending sealing section by compression thereof due to the flexible resilience thereof responsive to being urged into direct abutment and compression against the duct responsive to securement of said inner first leg surface of said first flange leg with respect to the duct with said supplemental seal in direct non-compressing abutting contact s with respect to the duct for enhancing firestop sealing between the structural panel and the penetrating duct without requiring attachment of said second flange leg directly with respect to the structural panel thereadjacent.

17. An apparatus for reinforcing and firestopping around a duct extending through a panel as defined in claim 16 wherein said sealing member is intumescent.

18. An apparatus for reinforcing and firestopping around a duct extending through a panel as defined in claim 16 further comprising a first flange leg reinforcing means extending therealong for enhancement of the structural strength thereof.

19. An apparatus for reinforcing and firestopping around a duct extending through a panel as defined in claim 16 further comprising a second flange leg reinforcing means extending therealong for enhancement of the structural strength thereof.

* * * * *